United States Patent [19]

Mohri et al.

[11] Patent Number: 4,782,584
[45] Date of Patent: Nov. 8, 1988

[54] ALKALINE CELL MANUFACTURING METHOD

[75] Inventors: Motoo Mohri, Nara; Tetsuya Yoneda, Tenri, both of Japan

[73] Assignee: Sharp Kabushiki Kaisha, Osaka, Japan

[21] Appl. No.: 33,687

[22] Filed: Apr. 3, 1987

[30] Foreign Application Priority Data

Apr. 4, 1986 [JP] Japan .................................. 61-78474

[51] Int. Cl.$^4$ ............................................. H01M 6/00
[52] U.S. Cl. .................................. 29/623.1; 24/623.2; 429/101; 429/252
[58] Field of Search ..................... 429/101, 251, 252; 29/623.1, 623.4

[56] References Cited

U.S. PATENT DOCUMENTS

| | | | |
|---|---|---|---|
| 2,475,153 | 7/1949 | Rock | 29/623.4 X |
| 3,713,890 | 1/1973 | Strier et al. | 429/252 |
| 4,253,936 | 3/1981 | Leysen et al. | 429/251 X |
| 4,605,603 | 8/1986 | Kanda et al. | 429/101 |

FOREIGN PATENT DOCUMENTS

| | | | |
|---|---|---|---|
| 408856 | 3/1968 | Australia | 429/251 |
| 0052811 | 10/1981 | European Pat. Off. | |
| 55/24321 | 2/1980 | Japan | 29/623.4 |
| 2162994A | 2/1986 | United Kingdom | |

Primary Examiner—Brian E. Hearn
Assistant Examiner—Stephen J. Kalafut
Attorney, Agent, or Firm—Birch, Stewart, Kolasch & Birch

[57] ABSTRACT

A powdered positive mixture, a powdered separator mixture, and a powdered negative mixture are filled sequentially into a mold in layers, then the layers of the positive mixture, the separator mixture and the negative mixture are compacted in the mold to form a laminated tablet. The laminated tablet is placed in a container, and is impregnated with an alkaline electrolyte queous solution. Then the container is sealed to produce an alkaline cell.

25 Claims, 2 Drawing Sheets

ALKALINE CELL MANUFACTURING METHOD

BACKGROUND OF THE INVENTION

The present invention relates to an alkaline cell manufacturing method for manufacturing an alkaline cell using an alkaline aqueous solution as the electrolyte.

In a conventional method of manufacturing an alkaline cell, such as a so-called coin type cell, using an alkaline aqueous solution as the electrolyte, a positive substrate impregnated or packed with a positive mixture containing a positive active material is cut in a positive disk, an electrolyte supporting material formed of a film or fibers of a polymer, namely, a so-called separator, is cut in a separator disk, and a negative substrate impregnated or packed with a negative mixture containing a negative active material is cut in a negative disk. Then the positive disk, the separator disk and the negative disk are placed one over another in a container, and the container is filled with an alkaline aqueous solution, and then the container is sealed. Such a conventional alkaline cell manufacturing method comprises many processes and hence is unable to manufacture alkaline cells as a low cost.

SUMMARY OF THE INVENTION

Accordingly, an object of the present invention is to provide an alkaline cell manufacturing method comprising simple manufacturing processes and capable of manufacturing alkaline cells at a low cost.

Another object of the present invention is to provide an alkaline cell manufacturing method comprising packing a positive mixture powder, a separator mixture powder and a negative mixture powder sequentially in a mold, compacting the layers of the positive mixture powder, the separator mixture powder and the negative mixture powder in the mold to form a laminated tablet, placing the laminated tablet in a container, impregnating the laminated tablet with an alkaline aqueous solution, and sealing the container.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly, according to an embodiment of the present invention, an alkaline cell manufacturing method is characterized in packing a positive mixture powder, a separator mixture powder and a negative mixture powder sequentially in a mold, compacting the positive mixture powder, the separator mixture powder and the negative mixture powder to form a laminated tablet, placing the laminated tablet in a container, impregnating the laminated tablet with an alkaline aqueous solution, and sealing the container.

BRIEF DESCRIPTION OF THE DRAWINGS

The present invention will become more fully understood from the detailed description given hereinbelow and the accompanying drawings which are given by way of illustration only, and thus are limitative of the present invention and wherein.

DETAILED DESCRIPTION OF THE INVENTION

Figure 1:
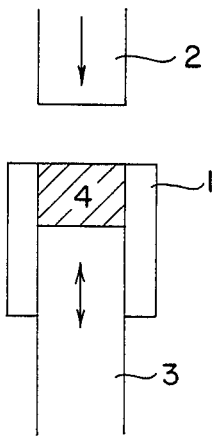
FIGS. 1 to 6 are diagrammatic illustrations of assistance in explaining a series of sequential steps of an alkaline cell manufacturing method, in a preferred embodiment of the present invention.

Referring to FIG. 1, there are shown a mold 1, a compacting rod 2 for compacting powder filled in the mold 1, and a bottom rod 3. The bottom rod 3 can be moved vertically relative to the mold 1 to vary the efective depth of the mold 1.

Figure 2:
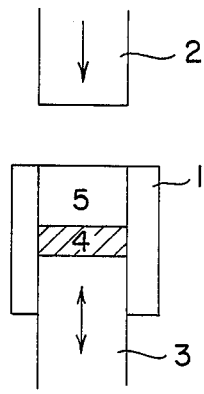
Figure 3:
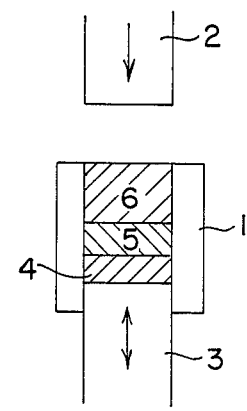
Figure 4:
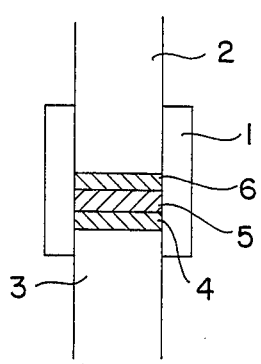

First, a positive mixture powder 4 is filled in the mold 1, and then the positive mixture powder 4 is compacted lightly with the compacting rod 2 to level the positive mixture powder 4. Then, the bottom rod 3 is lowered relative to the mold 1 to form a space for containing a separator mixture powder 5, namely, an electrolyte supporting material, and then the separator mixture powder 5 is poured into the space in the mold 1 over the layer of the positive mixture powder 4 as illustrated in FIG. 2. Then, the separator mixture powder 5 is compacted lightly with the compacting rod 2 to level the separator mixture powder 5. Then, the bottom rod 3 is lowered relative to the mold 1 to form a space for receiving a negative mixture power 6. Then, the negative mixture powder 6 is poured into the space in the mold 1 over the layer of the separator mixture powder 5 as illustrated in FIG. 3. The order of supplying the positive mixture powder 4, the separator mixture powder 5 and the negative mixture powder 6 may be inverted. Then, the layers of the positive mixture powder 4, the separator mixture powder 5 and the negative mixture powder 6 are compacted with the compacting rod 2 to form a laminated tablet as illustrated in FIG. 4. Since the separator mixture powder 5 is an insulating material not containing any ion source which causes the reduction and oxidation of the positive and the negative, the positive active material and the negative active material are not consumed to reduce the capacity in forming the laminated tablet by compacting the sequential layers of the positive mixture powder 4, the separator mixture powder 5 and the negative mixture powder 6. The separator mixture powder 5 may be of any powdered material as far as the material is suitable for such a compacting process and is capable of retaining an electrolyte solution in the gaps between the particles or the surfaces of the particles.

Figure 5:
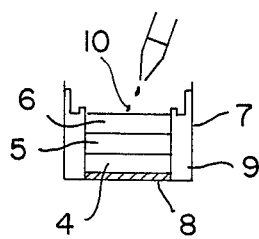
Figure 6:
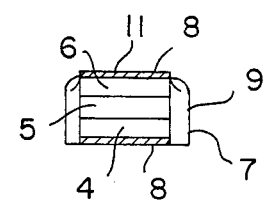

The laminated tablet of the positive mixture powder 4, the separator mixture powder 5 and the negative mixture powder 6 is removed from the mold 1, and then the laminated tablet is placed in a container 7 so as to be seated on a current collector 8 placed in the container 7 and to be surrounded by a sealing gasket 9 as illustrated in FIG. 5. Then, a suitable amount of an alkaline aqueous solution 10 as an alkaline electrolyte aqueous solution is supplied into the container 7 to impregnate the laminated tablet of the positive mixture powder 4, the separator mixture powder 5 and the negative mixture powder 6. The alkaline aqueous solution 10 may be contained beforehand in the container 7. Then, a top 11 is attached to the container 7, and then the container 7 and the top 11 are caulked to seal the container 7 to provide a coin type alkaline cell as shown in FIG. 6.

The alkaline cell manufacturing method according to the present invention forms the contents of the cell beforehand in a tablet, therefore the tablets of the contents can be produced through a separate mass-production system, which simplifies the alkaline cell manufacturing process.

The positive mixture powder used for forming an alkaline cell by the alkaline cell manufacturing method according to the present invention contains a positive active material, a conductive material and a binding agent. The positive active material is an oxidizing agent such as manganese dioxide, nickel oxide (IV), tungsten trioxide, lead dioxide, molybdenum trioxide, or the like. Manganese dioxide and nickel oxide (IV) are most preferable. The positive mixture powder contains an electrical conductive material, such as acetylene black, black lead, graphite, nickel powder, or the like, to secure electrical conductivity. Acetylene black is most preferable. A binding agent is mixed in the positive mixture powder to make each material for those components bind firmly. The binding agent is carboxymethyl cellulose, polytetrafluoroethylene, carboxymethyl cellulose salt, or the like. The contents of each of the conductive material and the binding agent are in the range about 3% to of about 20% by weight.

The separator mixture powder contains an electrolyte supporting material and a binding agent. Powdered electrolyte supporting material is used. The electrolyte supporting material may be any kind, such as silicon dioxide or alumina, as along as the material is alkali-resistant and insulating. The same binding agent as that mixed in the positive mixture powder is mixed in the electrolyte supporting material. The mixing ratio of the binding agent is in the range of about 3 to about 20 parts by weight in 100 parts by weight of the electrolyte supporting material.

The negative mixture powder contains the same binding agent and the same electrical conductive material as those contained in the positive mixture powder, and a negative active material. The negative active material is a hydrogen storage alloy which absorbs and stores hydrogen, such as TiNi, $TiNiB_{0.01}$, $TiNiMm_{0.01}$, $LaNi_5$, TiFe, or the like. The contents of each of the components of the negative mixture powder are in the same as those of the corresponding components of the positive mixture powder.

The alkaline aqueous solution may be potassium hydroxide, sodium hydroxide, lithium hydroxide, or the like. Also, the alkaline aqueous solution may be a mixture of two or more of potassium hydroxide, sodium hydroxide, lithium hydroxide, or the like.

The present invention will be described further in detail with reference to preferred embodiments thereof.

EMBODIMENT 1

Figure 7:
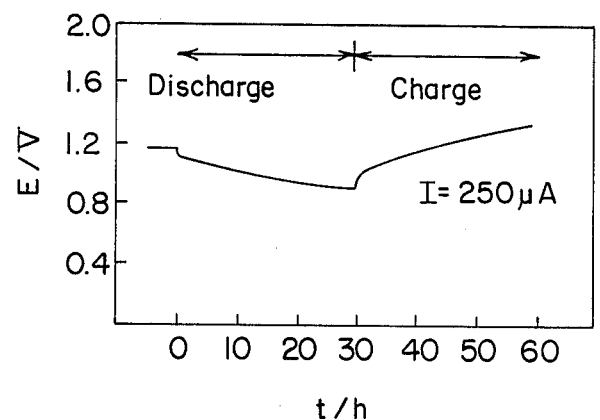
FIGS. 7 and 8 are graphs showing the charge-discharge characteristics of an alkaline cell manufactured by an alkaline cell manufacturing method according to the present invention.

A positive mixture powder is prepared by mixing 10 parts by weight gammamanganese dioxide, 2 parts by weight acetylene black (electrical conductive material) and 1 part by weight carboxymethyl cellulose (binding agent). Then, 200 mg of the positive mixture powder is put in a mold having an inside diameter of 15 mm and then the positive mixture powder is compacted lightly with a compacting rod. A separator mixture powder is prepared by mixing 20 parts by weight silicon dioxide and 1 part by weight carboxymethyl cellulose (binding agent). Then, 200 mg of the separator mixture powder is spread over the positive mixture powder in the mold, and is compacted lightly with the compacting rod. A negative mixture powder is prepared by mixing 10 parts by weight hydrogenated $TiNiMm_{0.01}$ (hydrogen storage alloy), 1 part by weight acetylene black (electrical conductive material) powder, and 1 part by weight carboxymethyl cellulose (binding agent). Then, 200 mg of the negative mixture powder is spread over the separator mixture powder in the mold, and then the layers of the positive mixture powder, the separator mixture powder and the negative mixture powder are compressed at a pressure of approximately 200 $kgw/cm^2$ to form a cell tablet, namely, the contents of the cell. The cell tablet is removed from the mold and is placed in a container. Then, 100 microliters of a 30% by weight potassium hydroxide aqueous soultion is poured into the container, and then the container is sealed. The charge-discharge characteristics at 25 degrees C of the alkaline cell thus fabricated are shown in FIG. 7.

EMBODIMENT 2

Figure 8:
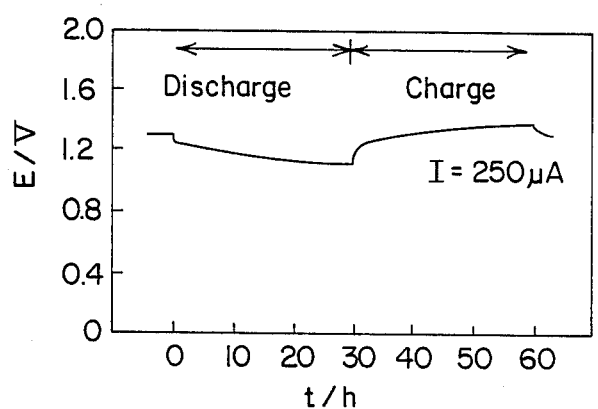

A positive mixture powder is prepared through the steps of mixing 10 parts by weight nickel hydroxide (II), 2 parts by weight acetylene black (electrical conductive material) and 0.5 parts by weight polytetrafluoroethylene powder, applying the mixture to a nickel substrate, charging the mixture in a potassium hydroxide solution, removing the charged mixture from the nickel substrate, and drying and pulverizing the charged mixture. Then, 200 mg of the positive mixture powder is spread in a mold of a 15 mm inside diameter and is compacted lightly with a compacting rod. The separator mixture powder is prepared by mixing 20 parts by weight alpha-alumina powder and 1 part by weight carboxymethyl cellulose (binding agent). Then, 200 mg of the separator mixture powder is spread over the positive mixture powder in the mold and is compacted lightly with the compacting rod. The same negative mixture powder as that employed in the Embodiment 1 is used. Then, 200 mg of the negative mixture powder is spread over the separator mixture powder in the mold, and then the layers of the positive mixture powder, the separator mixture powder and the negative mixture powder are compacted by the compacting rod at a pressure of 200 $kgw/cm^2$ to form a cell tablet. The cell tablet is removed from the mold, then the cell tablet is put in a container, then 100 microliters of 30% by weight potassium hydroxide aqueous solution is pured into the container, and then the container is sealed. The charge-discharge characteristics at 25 degrees C of the alkaline cell thus fabricated are shown in FIG. 8.

The pressure to be applied to the compacting rod in compacting the layers of the positive mixture powder, the separator mixture powder and the negative mixture powder to form a laminated cell is dependent on the amount of the mixtures fed into the mold. For example, the pressure is a pressure by which the layers are formed into the tablet.

While only certain embodiments of the present invention have been described, it will be apparent to those skilled in the art that various changes and modifications may be made therein without departing from the spirit and scope of the present invention as claimed.

What is claimed is:

1. An alkaline cell manufacturing method comprising the steps of:

sequentially filling a positive mixture powder, a separator mixture powder and a negative mixture powder into a mold;

compacting said positive mixture powder, said separator mixture powder and said negative mixture powder in said mold so as to form a laminated cell tablet;

placing said laminated cell tablet into a container;

impregnating said laminated cell tablet with an alkaline electrolyte solution; and sealing said container so as to produce an alkaline cell.

2. An alkaline cell manufacturing method as recited in claim 1, wherein said positive mixture powder contains a positive active material, an electrical conductive material and a binding agent.

3. An alkaline cell manufacturing method as recited in claim 2, wherein said positive active material is an oxidizing agent.

4. An alkaline cell manufacturing method as recited in claim 3, wherein said positive active material is manganese dioxide, nickel oxide (IV), tungsten trioxide, lead dioxide, or molybdenum trioxide.

5. An alkaline cell manufacturing method as recited in claim 2, wherein said electrical conductive material is acetylene black, black lead, graphite or powdered nickel.

6. An alkaline cell manufacturing method as recited in claim 2, wherein said binding agent is carboxymethyl cellulose, polytetrafluoroethylene or carboxymethyl cellulose salt.

7. An alkaline cell manufacturing method as recited in claim 1, wherein said negative mixture powder contains a negative active material, an electrical conductive material and a binding agent.

8. An alkaline cell manufacturing method as recited in claim 7, wherein said negative active material is a hydrogen storage alloy which stores hydrogen.

9. An alkaline cell manufacturing method as recited in claim 8, wherein said hydrogen storage alloy is $TiNi$, $TiNiB_{0.01}$, $TiNiMm_{0.01}$, $LaNi_5$ or $TiFe$.

10. An alkaline cell manufacturing method as recited in claim 7, wherein said electrical conductive material is acetylene black, black lead, graphite or powered nickel.

11. An alkaline cell manufacturing method as recited in claim 7, wherein said binding agent is carboxymethyl cellulose, polytetrafluoroethylene or carboxymethyl cellulose salt.

12. An alkaline cell manufacturing method as recited in claim 1, wherein said separator mixture powder contains an electrolyte supporting material and a binding agent.

13. An alkaline cell manufacturing method as recited in claim 12, wherein said electrolyte supporting material is alkali-resistant and insulating.

14. An alkaline cell manufacturing method as recited in claim 13, wherein the electrolyte supporting material is silicon dioxide or alumina.

15. An alkaline cell manufacturing method as recited in claim 12, wherein said binding agent is carboxymethyl cellulose, polytetrafluoroethylene or carboxymethyl cellulose salt.

16. An alkaline cell manufacturing method as recited in claim 1, wherein the alkaline electrolyte aqueous solution is potassium hydroxide, sodium hydroxide, lithium hydroxide, or a mixture of two or more of potassium hydroxide, sodium hydroxide and lithium hydroxide.

17. An alkaline cell manufacturing method as recited in claim 1, wherein said positive mixture powder is prepared by mixing nickel hydroxide (II), acetylene black and powdered polytetrafluoroethylene in a first mixture, applying said first mixture to a nickel substrate, charging said mixture in a potassium hydroxide aqueous solution to produce a charged mixture, removing said charged mixture from said nickel substrate, drying said charged mixture, and pulverizing said charged mixture so as to produce said positive mixture powder.

18. An alkaline cell manufacturing method comprising steps of:

(a) placing into a mold and compacting a positive mixture so as to form a compacted positive mixture layer;

(b) placing a separator mixture powder over said compacted positive mixture layer and compacting said separator mixture powder in said mold so as to form a separator mixture layer;

(c) placing a negative mixture powder over said compacted separator mixture layer and compacting said negative mixture powder in said mold so as to form a negative mixture layer;

(d) firmly compacting said positive mixture, said separator mixture and said negative mixture in said mold so as to form a laminated cell tablet;

(e) removing said laminated cell tablet from said mold and placing said laminated cell tablet in a container;

(f) impregnating said laminated cell tablet with an alkaline electrolyte aqueous solution in said container; and (g) sealing said container so as to produce an alkaline cell.

19. An alkaline cell manufacturing method comprising the steps of:

(a) placing into a mold and compacting a negative mixture so as to form a compacted negative mixture layer;

(b) placing a separator mixture powder over said compacted negative mixture layer and compacting said separator mixture powder in said mold so as to form a separator mixture layer;

(c) placing a positive mixture powder over said compacted separator mixture layer and compacting said positive mixture powder in said mold so as to form a positive mixture layer;

(d) firmly compacting said negative mixture, said separator mixture and said positive mixture in said mold so as to form a laminated cell tablet;

(e) removing said laminated cell tablet from said mold and placing said laminated cell tablet in a container;

(f) impregnating said laminated cell tablet with an alkaline electrolyte aqueous solution in said container; and (g) sealing said container so as to produce an alkaline cell.

20. An alkaline cell manufacturing method as recited in claim 2, wherein said positive active material is manganese dioxide or nickel oxide (IV); said electrical conductive material is acetylene black; and each of said electrical conductive material and said binding agent are present in an amount of from about 3% to about 20% by weight of said positive mixture powder.

21. An alkaline cell manufacturing method as recited in claim 1, wherein said positive mixture powder comprises manganese dioxide, acetylene black, and carboxymethyl cellulose; said separator mixture powder comprises silicon dioxide and carboxymethyl cellulose; said negative mixture powder comprises $TiNiMm_{0.01}$, acetylene black, and carboxymethyl cellulose; and said alkaline electrolyte solution comprises potassium hydroxide.

22. An alkaline cell manufacturing method as recited in claim 1, wherein said positive mixture powder comprises nickel hydroxide, acetylene black, and polytetrafluoroethylene powder; said separator mixture powder comprises alumina powder and carboxymethyl cellulose; said negative mixture powder comprises TiNiMm$_{0.01}$, acetylene black, and carboxymethyl cellulose; and said alkaline electrolyte solution comprises potassium hydroxide.

23. An alkaline manufacturing method as recited in claim 4, wherein said electrical conductive material is acetylene black, black lead, graphite or powdered nickel and wherein said binding agent is carboxymethyl cellulose, polytetrafluoroethylene or carboxymethyl cellulose salt.

24. An alkaline manufacturing method as recited in claim 9, wherein said electrical conductive material is acetylene black, black lead, graphite or powdered nickel and wherein said binding agent is carboxymethyl cellulose, polytetrafluoroethylene or carboxymethyl cellulose salt.

25. An alkaline cell manufacturing method as recited in claim 14, wherein said binding agent is carboxymethyl cellulose, polytetrafluoroethylene or carboxymethyl cellulose salt.

* * * * *